United States Patent
Liu et al.

(10) Patent No.: US 9,418,119 B2
(45) Date of Patent: *Aug. 16, 2016

(54) METHOD AND SYSTEM TO DETERMINE A CATEGORY SCORE OF A SOCIAL NETWORK MEMBER

(71) Applicant: LinkedIn Corporation, Mountain View, CA (US)

(72) Inventors: Yan Liu, Sunnyvale, CA (US); Shaobo Liu, Belmont, CA (US)

(73) Assignee: LinkedIn Corporation, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/625,424

(22) Filed: Feb. 18, 2015

(65) Prior Publication Data

US 2015/0278218 A1 Oct. 1, 2015

Related U.S. Application Data

(63) Continuation of application No. 14/224,315, filed on Mar. 25, 2014, now Pat. No. 8,990,191.

(51) Int. Cl.
*G06F 17/30* (2006.01)
*G06Q 50/00* (2012.01)

(52) U.S. Cl.
CPC ...... *G06F 17/3053* (2013.01); *G06F 17/30598* (2013.01); *G06F 17/30864* (2013.01); *G06Q 50/01* (2013.01)

(58) Field of Classification Search
CPC .......... G06F 17/30598; G06F 17/30861; G06F 17/30991; G06F 17/30867; G06F 17/30; G06F 17/3053; G06F 17/30554; G06F 17/3071; G06F 17/30864; G06Q 30/02; G06Q 30/0201; G06Q 30/0269; G06Q 50/01; H04L 51/32; H04L 67/24; H04L 65/403
USPC ......... 707/722, 723, 731, 732, 750, 755, 692, 707/738, 748, 758, 779, 798, 710, E17.108, 707/E17.014, E17.084, E17.054; 705/7.29, 705/7.14, 7.34, 14.45, 26.1, 321, 14.66, 705/319; 709/203, 204, 206, 217, 218, 219, 709/223, 224, 226, 230, 231; 715/808
See application file for complete search history.

(56) References Cited

U.S. PATENT DOCUMENTS 6,195,657 B1 * 2/2001 Rucker ............... G06F 17/3061
707/731
6,755,740 B2 6/2004 Wen et al.
(Continued)

OTHER PUBLICATIONS

Stelios Sotiriadis, Nik Bessis, Paul Sant, Carsten Maple—"A resource discovery architecture of loosely coupled grid inter-cooperated Virtual Organisations using mobile agents and neural networks"—2010 International Conference on P2P, Parallel, Grid, Cloud and Internet Computing—Nov. 4-6, 2010, Fukuoka—pp. 320-325.*

(Continued)

*Primary Examiner* — Anh Ly
(74) *Attorney, Agent, or Firm* — Schwegman Lundberg & Woessner, P.A.

(57) ABSTRACT

A method and system to determine a category score of a social network member is described. An example system comprises a sample selector, a weight value module, a storing module, an access module, and a category score module. The sample selector selects a sample of member profiles from the profiles maintained by an on-line social network system. The weight value module obtains respective weight values associated with various phrases present in the sample of member profiles. The access module accesses a member profile and the weighted phrases associated with a certain category. The category score module determines a category score for the member profile based on a presence of one or more phrases from the plurality of weighted phrases in the member profile.

14 Claims, 5 Drawing Sheets

(56) References Cited

U.S. PATENT DOCUMENTS

| | | | |
|---|---|---|---|
| 7,680,770 B1* | 3/2010 | Buyukkokten | G06Q 10/10 340/573.1 |
| 7,702,631 B1 | 4/2010 | Basu et al. | |
| 7,730,017 B2 | 6/2010 | Nance et al. | |
| 7,895,177 B2 | 2/2011 | Wu | |
| 8,010,460 B2 | 8/2011 | Work et al. | |
| 8,015,019 B1* | 9/2011 | Smith et al. | 705/1.1 |
| 8,341,169 B2 | 12/2012 | Nance et al. | |
| 8,473,503 B2 | 6/2013 | Cheng et al. | |
| 8,484,083 B2 | 7/2013 | Basu et al. | |
| 8,504,559 B1 | 8/2013 | Elman et al. | |
| 8,650,177 B2 | 2/2014 | Skomoroch et al. | |
| 8,990,191 B1 | 3/2015 | Liu et al. | |
| 8,996,350 B1* | 3/2015 | Dub | G06F 17/30011 704/1 |
| 2005/0159970 A1* | 7/2005 | Buyukkokten et al. | 705/1 |
| 2006/0042483 A1* | 3/2006 | Work et al. | 707/722 |
| 2007/0078803 A1 | 4/2007 | Gilmour et al. | |
| 2008/0071929 A1* | 3/2008 | Motte | G06F 17/3089 709/246 |
| 2008/0243780 A1 | 10/2008 | Nance et al. | |
| 2008/0275849 A1 | 11/2008 | Basu et al. | |
| 2008/0301112 A1* | 12/2008 | Wu | 707/E17.001 |
| 2008/0306830 A1 | 12/2008 | Lasa et al. | |
| 2009/0070219 A1* | 3/2009 | D'Angelo | G06Q 10/10 705/14.56 |
| 2009/0276233 A1* | 11/2009 | Brimhall | G06Q 40/025 705/38 |
| 2010/0030578 A1 | 2/2010 | Siddique et al. | |
| 2010/0070184 A1* | 3/2010 | Parkin | C12Q 1/703 702/19 |
| 2010/0174726 A1 | 7/2010 | Nance et al. | |
| 2011/0035323 A1* | 2/2011 | Hamilton et al. | 705/301 |
| 2011/0119264 A1* | 5/2011 | Hu et al. | 707/728 |
| 2011/0123100 A1* | 5/2011 | Carroll | G06F 19/3437 382/155 |
| 2011/0173198 A1* | 7/2011 | Malleshaiah | G06F 17/30867 707/737 |
| 2011/0246379 A1* | 10/2011 | Maddox | G06Q 40/06 705/310 |
| 2012/0036127 A1 | 2/2012 | Work et al. | |
| 2012/0072384 A1 | 3/2012 | Schreiner et al. | |
| 2012/0197993 A1* | 8/2012 | Skomoroch et al. | 709/204 |
| 2012/0233082 A1* | 9/2012 | Custer et al. | 705/319 |
| 2012/0246232 A1* | 9/2012 | Schoen | G06Q 10/10 709/204 |
| 2012/0310619 A1* | 12/2012 | McConaghy | G06F 17/504 703/14 |
| 2013/0031088 A1* | 1/2013 | Srikrishna | G06F 17/30864 707/722 |
| 2013/0054615 A1 | 2/2013 | Liu et al. | |
| 2013/0054625 A1 | 2/2013 | Bhagwan et al. | |
| 2013/0218877 A1 | 8/2013 | Satyanarayanan | |
| 2013/0226910 A1 | 8/2013 | Work et al. | |
| 2013/0282550 A1* | 10/2013 | Sycoff | G06Q 30/02 705/37 |
| 2013/0290448 A1 | 10/2013 | Work et al. | |
| 2013/0297581 A1 | 11/2013 | Ghosh et al. | |
| 2013/0297589 A1 | 11/2013 | Work et al. | |
| 2013/0297714 A1 | 11/2013 | Basu et al. | |
| 2014/0081928 A1 | 3/2014 | Skomoroch et al. | |
| 2014/0108965 A1* | 4/2014 | Schoen | G06Q 10/10 715/753 |
| 2014/0149206 A1 | 5/2014 | Dubey et al. | |
| 2014/0278633 A1* | 9/2014 | Daly et al. | 705/7.14 |
| 2014/0317126 A1 | 10/2014 | Work et al. | |
| 2014/0358607 A1* | 12/2014 | Gupta et al. | 705/7.14 |
| 2015/0005176 A1* | 1/2015 | Kim | G06F 19/22 702/19 |
| 2015/0100683 A1* | 4/2015 | Chung et al. | 709/224 |
| 2015/0101008 A1* | 4/2015 | Zent | H04L 63/20 726/1 |

OTHER PUBLICATIONS

Jiang-Ming Yang et al.—"Search-based Query Suggestion"—CIKM'08, Oct. 26-30, 2008, Napa Valley, California, USA.—Proceeding CIKM '08 Proceedings of the 17th ACM conference on Information and knowledge management—pp. 1439-1440.*

"U.S. Appl. No. 14/224,315, Non-Final Office Action mailed Jul. 10, 2014", 18 pgs.

"U.S. Appl. No. 14/224,315, Notice of Allowance mailed Nov. 14, 2014", 11 pgs.

Ahmedi, L., et al., "Tourist Tour Planning Supported by Social Networks Analysis", Published in:Social Informatics (SocialInformatics), 2012 International Conference on, (2012), 295-303.

Ibrahim, S.N.A., et al., "Scalable e-business social network using MultiCrawler agent", Computer and Communication Engineering, (2008), 702-706.

* cited by examiner

METHOD AND SYSTEM TO DETERMINE A CATEGORY SCORE OF A SOCIAL NETWORK MEMBER

CROSS-REFERENCE TO RELATED APPLICATION

This application is a continuation of U.S. patent application Ser. No. 14/224,315, filed Mar. 25, 2014, now U.S. Pat. No. 8,990,191, issued Mar. 24, 2015.

TECHNICAL FIELD

This application relates to the technical fields of software and/or hardware technology and, in one example embodiment, to system and method to determine a category score of a social network member.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
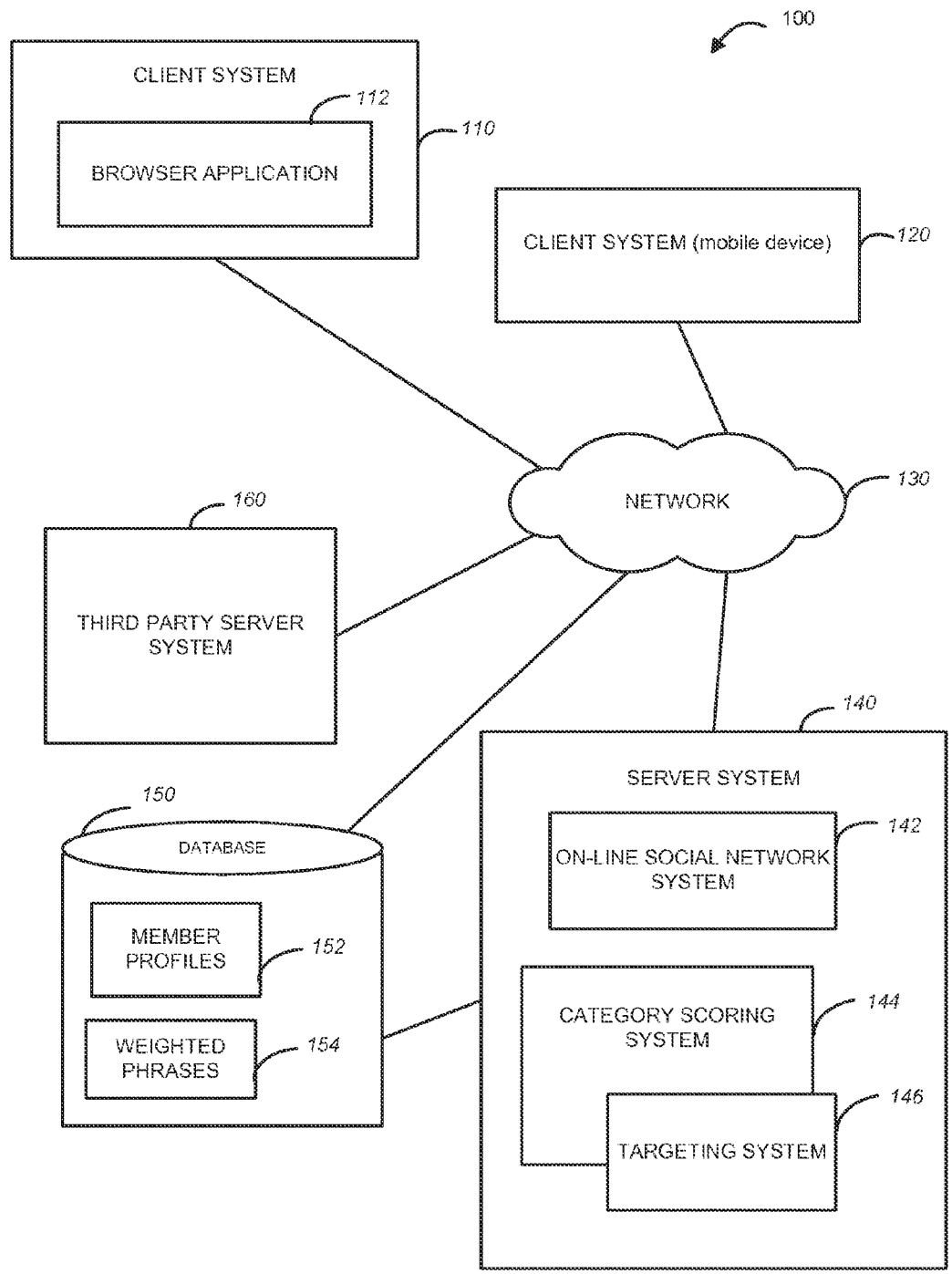
FIG. 1 is a diagrammatic representation of a network environment within which an example method and system to determine a category score of a social network member may be implemented.

A method and system to generate category scores for the profiles of members in an on-line social network is described.

In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate that member's connection to other members of the social network. A member profile may also include or be associated with comments or endorsements from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information provided by the member's connections. Information provided by the member's connections may be, e.g., recommendations, endorsements and skills. The profile of a member may include several items or units of a profile. For example one unit of a profile may contain information about the member's education, while another unit may contain information about the member's current and past employment.

An on-line social networking system may be configured to maintain one or more labels or categories that could be associated with a member profile. These categories may indicate a member's area of engagement or profession (e.g., sales, engineering, management, etc.), a member's career stage (e.g., a student, a career climber, a career keeper, etc.), or any other status or tendency that may be ascribed to a member. For example, a member category may be a sales category, which indicates that a member is a sales professional. Recognizing that a member can be associated with a certain category may be useful in determining whether that member is to be targeted for a particular promotion, or whether that member is likely to engage in a certain behavior in the context of the on-line social network. For example, if it can be determined that a member is engaged professionally in sales or business development, it may be inferred that the member may be more likely to purchase a subscription to premium services offered in the in-line social networking system than other members, such as, e.g., engineers. Often times, a member's profile does not explicitly indicate that the member can be associated with a particular category. It may be beneficial to determine how likely it is that a member is associated with a certain category. A measure of likelihood that a member is associated with a certain category may be termed a category score for the member profile.

Method and system are described for generating respective category scores for member profiles in the context of an on-line social network. According to one example embodiment, the data contained in and associated with a member profile may be examined and processed to generate a value with respect to a particular category that may be viewed as indicative of a member profile being associated with that particular category. The method operates by examining phrases contained in and associated with a member profile, determining whether any of these phrases have been given a weight value, and calculating the category score for the member profile based on the weight values of phrases from the member profile. The phrases and their associated weight values, referred to as weighted phrases or, collectively, a bank of weighted phrases, may be stored in a database maintained by or accessible by the on-line social networking system.

In some embodiments, a category score for a member profile may be generated using the member's social data—information from the member profiles of those members who are connections of the subject member. For example, if a member profile contains little information, e.g., very few phrases that describe the associated subject member, a category score for such member profile may be generated using the member's social data. In one embodiment, a category score for a member profile may be adjusted based on category scores of the member's connections.

A category score for a member profile may also be generated by taking into account behavior data of a member represented by the member profile. The behavior data of the member reflects activities of the member in the on-line social network system. A score generated based on the weight values of phrases from the member profile may be then termed definition score and a score generated based on the member's behavior data may be termed propensity score. A category score for a member profile may be generated as a combination of the definition score and the propensity score.

A bank of weighted phrases for a particular category, termed a target category, may be created using a variety of approaches. For example, a plurality of weighted phrases may be generated by a based on a seed sample of member profiles from the on-line social networking system. First, a random sample (e.g., ten thousand randomly-picked profiles) may be first selected. Then, a category scoring system may extract phrases from those randomly-picked profiles for each phrase from the plurality phrases and generate respective weight values for some or for all phrases, based on all phrases present in the random sample of member profiles and on the target category and, possibly on other factors.

The weighted phrases can be stored in a database as associated with the target category and then used for determining the likelihood of a member profile being associated with the target category. For example, if the target category is "sales/development," the collection of weighted phrases associated with the "sales/development" category may be used to generate a numeric value—a category score—for a member profile reflecting the likelihood that the associated member is a sales or development professional.

In another embodiment, a seed sample of member profiles may be selected not randomly, but according to a certain criteria. Using the scenario above, where the target category is "sales/development," the member profiles of those members who have purchased a subscription to a service provided by the on-line social networking system are given the "sales/development" label and are presumed to be associated with the "sales/development" category. The phrases that appear most commonly in the seed sample of profiles are assigned a higher weight value, while the phrases that appear less frequently in the seed sample of profiles are assigned a lower weight value. For example, phrases like "sales representative" and "business development" may appear in a large portion of the seed profiles and those phrases would be given a higher weight value with respect to the "sales/development" category. Phrases like "student" and "cloud computing" may appear in very few or none of the seed profiles and those would be given a negative weight value with respect to the "sales/development" category, because members that have these phrases appear in their profiles are rarely sales representatives or business development professionals. Some phrases, like, e.g., "great" or "well done" may be regarded as neutral with respect to a target category and be given a zero value, as they contribute no indication of whether the member profile can be associated with the "sales/development" category. Same phrases that appear in different fields of a member profile may be treated as different phrases. In one embodiment, respective weight values may be calculated for phrases in the seed profiles using one of the existing machine learning algorithms, such as, e.g., regularized linear regression, support vector machine (SVM), Naïve Bayes, etc. A matrix may be constructed based on the data stored in the seed profiles and a value may be generated for each user/phrase pair. The data stored in the seed profiles may include information such as title, education information, position, summary, patents, projects, publications, company, channel etc. An example matrix generated for determining weight values for phrases in the seed profiles is shown in Table 1 below.

TABLE 1

|  | title: business development | skill: cloud computing | ... | group: sales |
|---|---|---|---|---|
| user 1 | x11 | x12 |  | x1m |
| user 2 | x21 | x22 |  | x2m |
| user n | xn1 | xn2 |  | xnm |

There are different ways to assign values to $x_{ij}$ $\{i=1:n, j=1:m\}$.

Binary—1/0

Count—count the number of occurrences

TF/IDF (term frequency-inverse document frequency)

The dimensions of the matrix can be further expanded by adding user behavior and social features such as connections, page views, number of connections whose title contain a certain term, such as, e.g., "sales," etc.

An example method and system for generating category scores for a social network member may be implemented in the context of a network environment 100 illustrated in FIG. 1. As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a category scoring system 144 and a targeting system 146. In one example embodiment, the category scoring system 144 is configured to examine profile information of a member and generate a category score for a member profile with respect to a target category, utilizing a bank of weighted phrases associated with the target category. The weighted phrases may be stored in the database 150 as weighted phrases 154. The targeting system 146 may be part of or cooperate with the category scoring system 144. The targeting system 146 may be utilized to examine member profiles stored in the database 150 to determine whether a particular member profile should be targeted for a certain purpose (e.g., advertisement or a job suggestion, etc.) based on a category score associated with a certain category determined for that member profile.

As mentioned above, a category score may be indicative of the member's professional and/or academic status and may be represented by a numerical value, e.g., a number between 1 and 10. The category scoring system 144 may be configured to perform the weighting of phrases, e.g., by analyzing phrases present in randomly or non-randomly selected group of member profiles. Alternatively, or additionally, the category scoring system 144 may be configured to obtain a collection of weighted phrases for a certain target category from another utility application, which may be provided by or executing at a server computer system of a third party actor, e.g., at a third party server system 160. An example category scoring system 144 is illustrated in FIG. 2.

Figure 2:
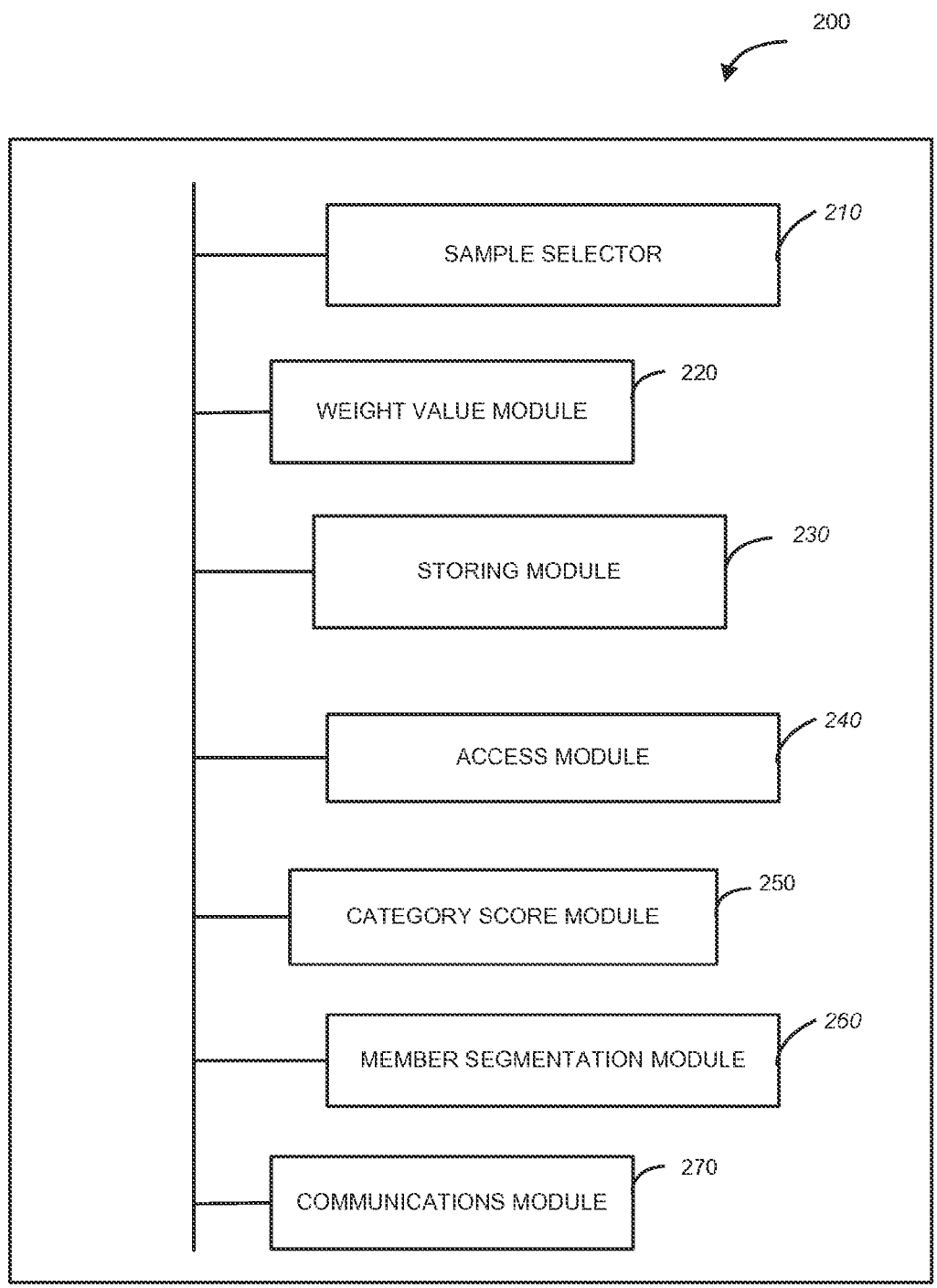
FIG. 2 is block diagram of a system to generate and use a category score of a social network member, in accordance with one example embodiment.

FIG. 2 is a block diagram of a system 200 to generate and use category scores for members of an on-line social network, in accordance with one example embodiment. As shown in FIG. 2, the system 200 includes a sample selector 210, a weight value module 220, a storing module 230, an access module 240, and a category score module 250.

The sample selector 210 may be configured to select a sample of member profiles from the profiles maintained by an on-line social network system. As explained above, a member profile represents a member of the on-line social network system. The weight value module 220 may be configured to obtain, for at least some phrases present in the random sample of member profiles, respective weight values for a target category. In one embodiment, a weight value of a phrase may be calculated based on phrases present in the sample of member profiles and also utilizing the target category. The on-line social network system may maintain one or more member categories (or category labels), such as, e.g., a "potential subscriber" category, a "sales professional" category, an "executive" category, etc. A phrase may have a certain weight value with respect to one category and a different weight with respect to another category. For example, with respect to a "sales professional" category the phrase "sales and marketing" may have a higher weight value than with respect to an "engineering" category. Conversely, the phrase "software development" may have a higher weight value with respect to an "engineering" category than with respect to a "nursing" category.

A combination of a phrase and its weight value may be termed a weighted phrase. The phrases together with their respective weight values with respect to a category may be termed weighted phrases. The storing module 230 may be configured to store the plurality of weighted phrases in a database.

The access module 240 may be configured to access a member profile from the on-line social network system and also access the plurality of weighted phrases associated with a certain category (a target category), in order to start the process of determining a category score for that member profile with respect to the target category. The category score module 250 may be configured to determine a category score for the member profile based on a presence of one or more phrases from the plurality of weighted phrases in the member profile. As explained above, the category score indicates the likelihood of the member profile being associated with the target category.

As mentioned above, the weight value module 220 may be configured to obtain respective weight values for phrases with respect to a category. In some embodiments, the obtaining of the weight values for phrases with respect to a category may include generating said weight values. The weight value module 220 may thus be configured to extract the plurality of phrases from a sample of member profiles and to calculate a weight value for each phrase from the plurality phrases.

A sample of member profiles that is used for obtaining phrases and generating their respective values—the so-called seed profiles—may be not random, but selected based on a predetermined criteria. For example, the predetermined criteria may be based on a particular activity or behavior of a member in the context of the on-line social network system. One such criterion may be the action of purchasing a subscription to a service provided by the on-line social networking system. For example, where the target category is "potential subscriber," the member profiles of those members who have purchased a subscription to a service provided by the on-line social networking system are given the "potential subscriber" label and are presumed to be associated with the "potential subscriber" category. The phrases that appear most commonly in the seed sample of profiles are assigned a higher weight value, while the phrases that appear less frequently in the seed profiles are assigned a lower weight value. For example, phrases like "sales representative" and "business development" may appear in a large portion of the seed profiles and those phrases would be given a higher weight value with respect to the "potential subscriber" category.

In other embodiments, the obtaining of the weight values for phrases with respect to a category may include providing the plurality of phrases from a sample of member profiles— that were selected randomly or according to a predetermined criteria—to a further computer system, e.g., to a third party computer system. The processing of the phrases found in the sample of member profiles may be performed at the further computer system, e.g., at the third party server system 160 of FIG. 1. The weight value module 220 may then receive the plurality of weighted phrases from the further computer system.

The category score module 250 may be configured to determine, based on a presence of one or more phrases from the plurality of weighted phrases in a member profile, a category score for that member profile, where the category score indicates the likelihood of the member profile being associated with the target category. In one embodiment, the category score module 250 may also be configured to access behavior data of a member represented by the member profile, generate propensity score for the member profile based on the behavior data of the member, and utilize the propensity score in generating the category score for the member profile. The behavior data of the member reflects activities of the member in the on-line social network system. Where the behavior data of a member is used in generating a category score, the category score module 250 may be configured to generate a score for the member profile based on phrases that are present in the member profile (termed definition score), generate a score for the member profile based on behavior data of a member represented by the member profile (termed propensity score), and combine the definition score and the propensity score to generate a category score for the member profile. In one embodiment, a definition score is determined by accessing a plurality of weighted phrases stored in a database, determining respective weights for phrases present in the member profile utilizing the plurality of weighted phrases, and combining the respective weights for phrases present in the member profile to produce the definition score. As described above, a category score associated with a "potential subscribers" category may indicate the likelihood that the member becomes a subscriber to a service provided by the on-line social network system. In this scenario a category score may be referred to as a subscriber score.

The category score module 250 may also be configured to use social data of a member represented by a member profile in generating a category score. For example, the category score module 250 may be configured to access the profile of a member who is a connection of the member represented by the member profile, for which a category score is being determined, utilize a category score of that member profile for generating the category score for the member profile. The category score module 250 may be configured to adjust the category score of the member profile based on the category score of the profile of the member's connection or to assign the category score of the profile of the member's connection to the member profile. The storing module 230 may be configured to store the category score of the member profile as associated with the member profile, e.g., in the database 150 of FIG. 1.

Also shown in FIG. 2 are a member segmentation module 260 and a communications module 270. The member segmentation module 260 may be configured to retrieve, from a database, the category score for the member profile; compare the category score for the member profile to a threshold value; and, based on a result of the comparing, selectively identify the member profile as associated with the target category. The communications module 270 may be configured to selectively send a communication to the member based on a result of the comparing, responsive to the member profile having been identified as associated with the target category. For example, where the category scoring system 144 is utilized to determine which members of the on-line network system 142 are likely to be interested in purchasing a subscription to a service provided by the on-line network system 142, the target category may be labeled "potential subscribers." When the category scoring system 144 identifies a member profile as likely to represent a member who is a potential subscriber, based on the calculated category score, the communications module 270 may send an email to the member represented by the member profile inviting the member to subscribe to a service provided by the on-line network system 142 and, optionally, offer a subscription discount.

The modules shown in FIG. 2 may represent the modules included in the category scoring system 144 and the targeting system 146, both of FIG. 1. The sample selector 210, the weight value module 220, the storing module 230, the access module 240, and the category score module 250 may be part of the category scoring system 144 of FIG. 1. The member segmentation module 260 and the communications module 270 may be part of the targeting system 146. As mentioned above, all of the modules shown in FIG. 2 may be part of a single system that combines the functionality of both the category scoring system 144 and the targeting system 146 of FIG. 1.

Figure 3:
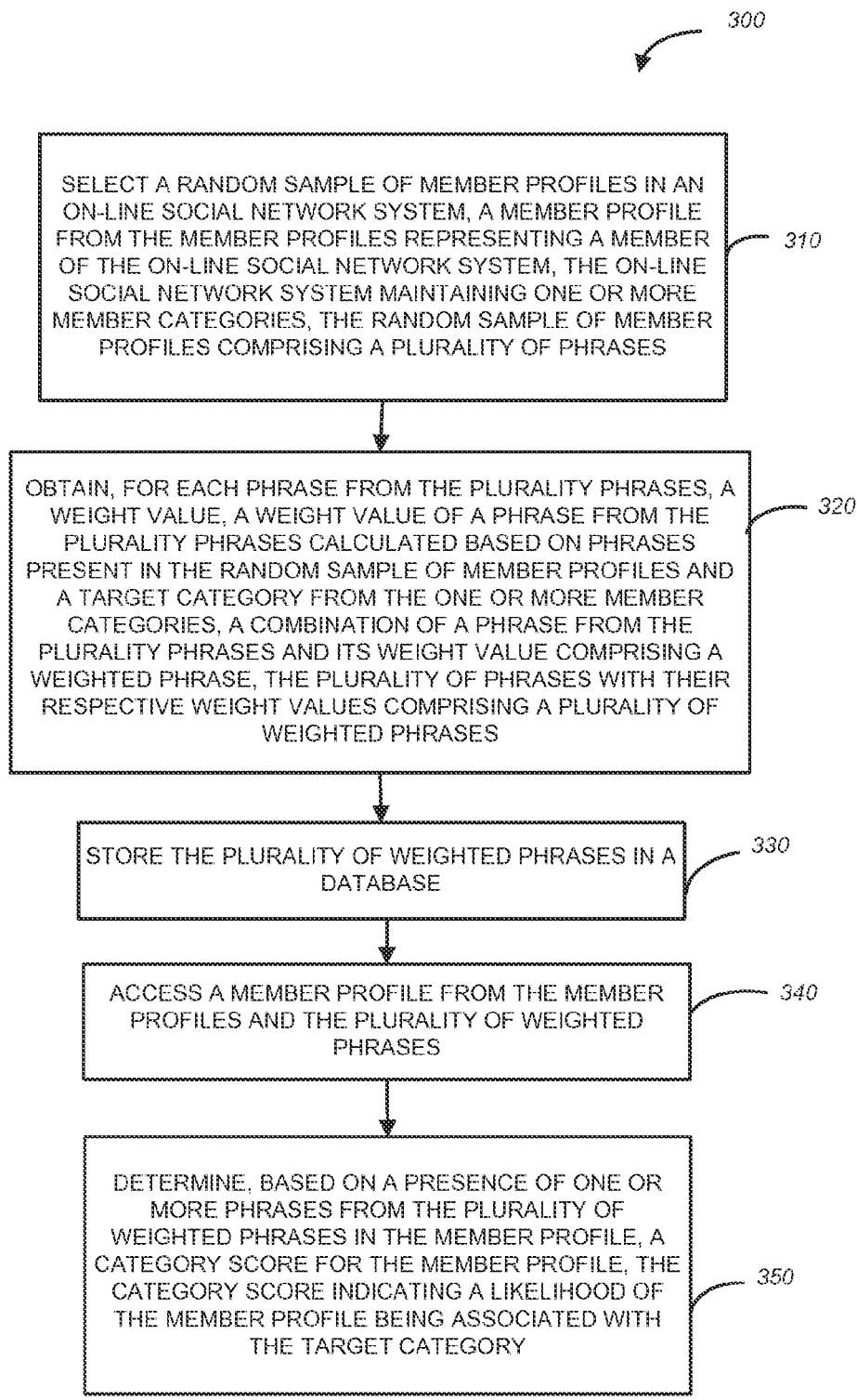
FIG. 3 is a flow chart of a method to determine a category score of a social network member, in accordance with an example embodiment.

FIG. 3 is a flow chart of a method 300 to generate category scores for members of an on-line social network, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the sample selector 210 of FIG. 2 selects a random sample of member profiles from the profiles 152 maintained by the on-line social network system 142 of FIG. 1. The weight value module 220 of FIG. 2 obtains, for at least some phrases present in the random sample of member profiles, respective weight values for a target category, at operation 320. As explained above, the obtaining of respective weight values for phrases with respect to a category may include generating said weight values. The obtaining of respective weight values for phrases with respect to a category may include providing the plurality of phrases from a sample of member profiles—that were selected randomly or according to a predetermined criteria—to a further computer system, e.g., to a third party computer system, such as, e.g., to the third party server system 160 of FIG. 1 and receiving the plurality of weighted phrases from the further computer system. At operation 330, the storing module 230 stores the plurality of weighted phrases in a database, e.g., in the database 150 of FIG. 1.

At operation 340, the access module 240 of FIG. 2 accesses a member profile from the on-line social network system 142 and also access the plurality of weighted phrases associated with a target category, in order to start the process of determining a category score for that member profile with respect to the target category. At operation 350, the category score module 250 of FIG. 2 determines, based on a presence of one or more phrases from the plurality of weighted phrases in a member profile, a category score for that member profile. In one embodiment, the category score may be determined utilizing propensity score for the member profile. Propensity score may be generated based on the behavior data of the member represented by the member profile.

Figure 4:
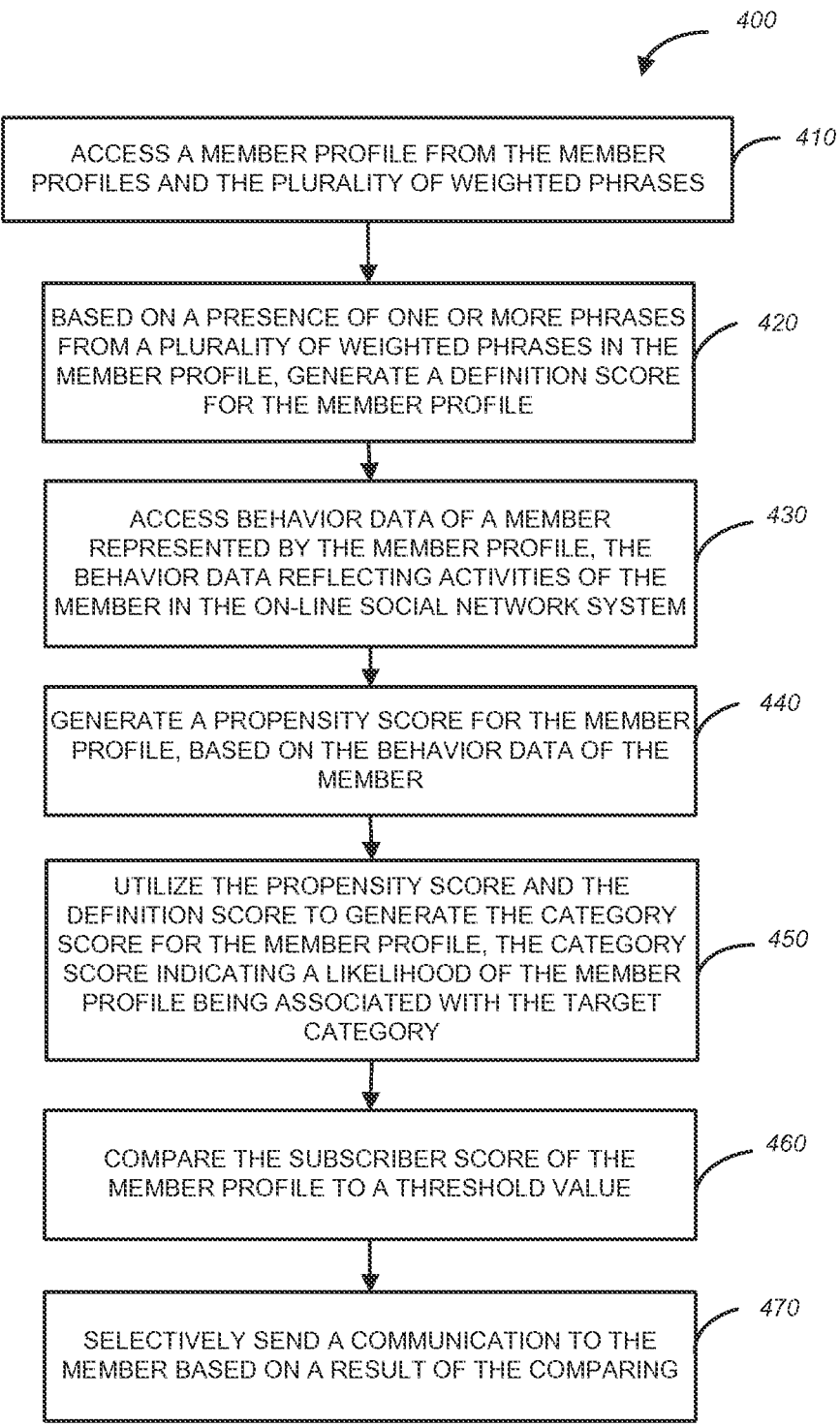
FIG. 4 is a flow chart of a method for utilizing a category score of a social network member, in accordance with an example embodiment.

FIG. 4 is a flow chart of a method 400 for utilizing category scores, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1.

As shown in FIG. 4, the method 400 commences at operation 410, when the access module 240 of FIG. 2 accesses a member profile from the on-line social network system 142 and also access the plurality of weighted phrases associated with a target category, in order to start the process of determining a category score for that member profile with respect to the target category. At operation 420, the category score module 250 of FIG. 2 determines, based on a presence of one or more phrases from the plurality of weighted phrases in a member profile, definition score for that member profile. At operation 430, the category score module 250 generates propensity score for the member profile based on behavior data of the member represented by the member profile. A category score is generated for the member profile based on both the definition score and the propensity score, at operation 440. As mentioned above, a category score that indicates the likelihood of the member becoming a subscriber to a service provided by the on-line social network system a category score may be referred to as a subscriber score.

At operation 460, the member segmentation module 260 compares the category score of the member profile to a threshold value. The communications module 270 selectively sends a communication to the member based on a result of the comparing, at operation 470.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 5:
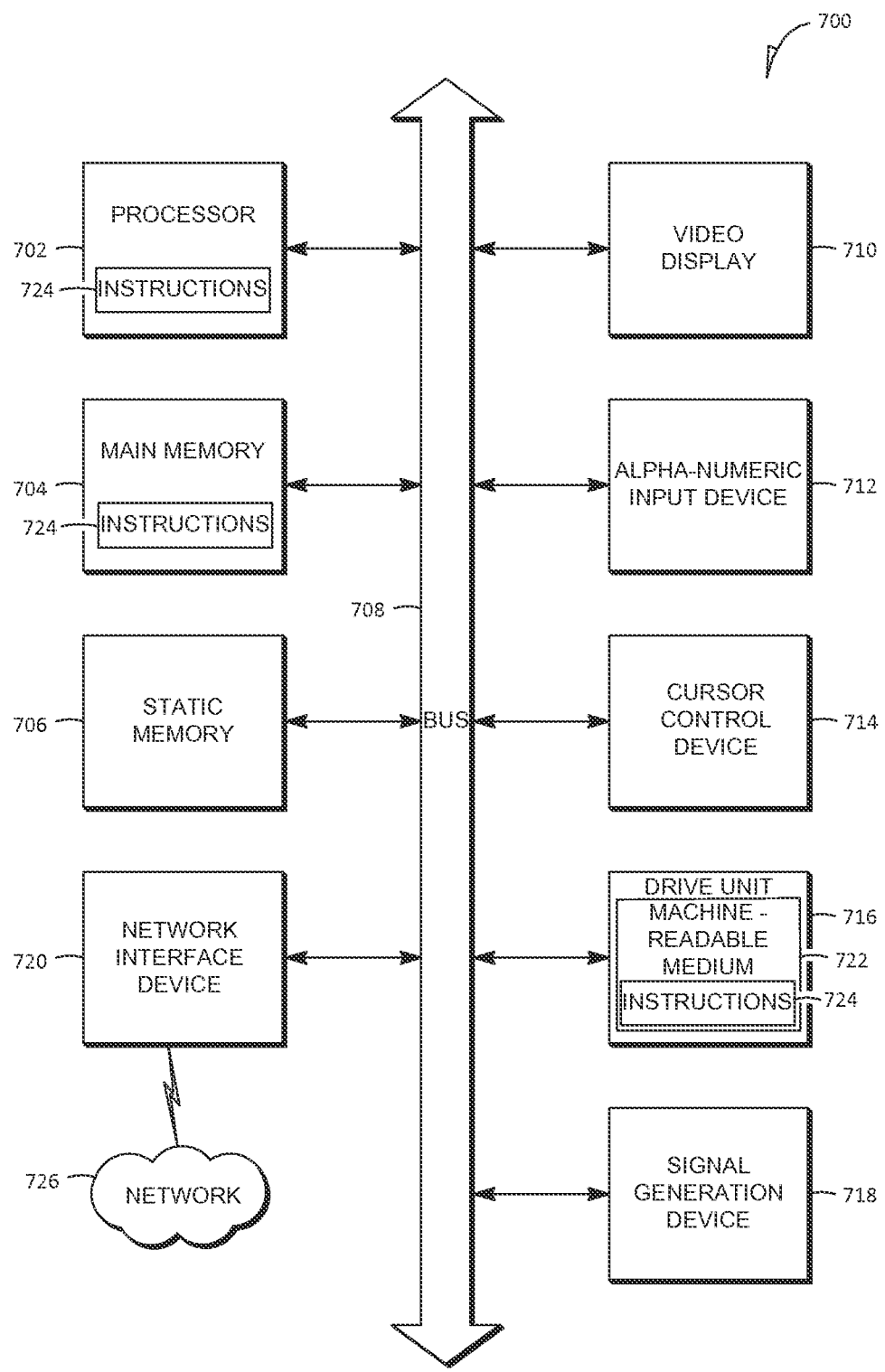
FIG. 5 is a diagrammatic representation of an example machine in the form of a computer system within which a set of instructions, for causing the machine to perform any one or more of the methodologies discussed herein, may be executed.

FIG. 5 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to determine a category score of a social network member has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:

using at least one processor coupled to a memory, selecting a seed sample of member profiles in an on-line social network system, a member profile from the member profiles representing a member of the on-line social network system, the on-line social network system maintaining one or more member categories, the seed sample of member profiles comprising a plurality of phrases, each member profile from the member profiles comprising two or more phrases;

associating each profile from the seed sample of member profiles with a target category from the one or more member categories;

for each phrase from the plurality phrases, obtaining a weight value utilizing regularized linear regression, a weight value of a phrase from the plurality phrases calculated based on presence or absence of a respective phrase in the seed sample of member profiles, a combination of a phrase from the plurality phrases and its weight value comprising a weighted phrase, the plurality of phrases with their respective weight values comprising a plurality of weighted phrases for the target category, the obtaining of a weight value for each phrase from the plurality phrases comprises identifying a neutral phrase from the plurality phrases and assigning a zero weight value to the neutral phrase;

accessing a member profile from the member profiles and the plurality of weighted phrases;

based on a presence of one or more phrases from the plurality of weighted phrases in the member profile, generating a category score for the member profile, the category score indicating a likelihood of the member profile being associated with the target category;

retrieving, from a database, the category score of the member profile;

comparing the category score of the member profile to a threshold value; and based on a result of the comparing, selectively identifying the member profile as associated with the target category.

2. The method of claim 1, wherein each profile from the seed sample of member profiles comprises data indicative of a purchased subscription to a service provided by the on-line social networking system.

3. The method of claim 1, comprising assigning a negative weight value to a phrase from the plurality phrases based on the absence of the phrase in the seed sample of member profiles.

4. The method of claim 1, comprising assigning a weight value to a phrase from the plurality phrases based on frequency of the phrase in the seed sample of member profiles.

5. The method of claim 1, wherein the obtaining of a weight value for each phrase from the plurality phrases comprises utilizing support vector machine (SVM).

6. The method of claim 1, wherein the obtaining of a weight value for each phrase from the plurality phrases comprises utilizing Naïve Bayes algorithm.

7. The method of claim 1, comprising:
responsive to identifying the member profile as associated with the target category, sending a communication to a member represented by the member profile.

8. A computer-implemented system comprising:
a sample selector, implemented using at least one processor, to select, using the at least one processor, a random sample of member profiles in an on-line social network system, a member profile from the member profiles representing a member of the on-line social network system, the on-line social network system maintaining one or more member categories, the random sample of member profiles comprising a plurality of phrases, each member profile from the member profiles comprising two or more phrases;
a weight value module, implemented using at least one processor, to obtain, using regularized linear regression, for each phrase from the plurality phrases, a weight value of a phrase from the plurality phrases calculated based on presence or absence of a respective phrase in the seed sample of member profiles, a combination of a phrase from the plurality phrases and its weight value comprising a weighted phrase, the plurality of phrases with their respective weight values comprising a plurality of weighted phrases for the target category, the weight value identify a neutral phrase from the plurality phrases and assign a zero weight value to the neutral phrase;
an access module, implemented using at least one processor, to access a member profile from the member profiles and the plurality of weighted phrases, using the at least one processor;
a category score module, implemented using at least one processor, to determine, using the at least one processor, based on a presence of one or more phrases from the plurality of weighted phrases in the member profile, a category score for the member profile, the category score indicating a likelihood of the member profile being associated with the target category; and
a member segmentation module to:
retrieve, from a database, the category score of the member profile;
compare the category score of the member profile to a threshold value; and
based on a result of the comparing, selectively identify the member profile as associated with the target category.

9. The system of claim 8, wherein each profile from the seed sample of member profiles comprises data indicative of a purchased subscription to a service provided by the on-line social networking system.

10. The system of claim 8, wherein the weight value module is to assign a negative weight value to a phrase from the plurality phrases based on the absence of the phrase in the seed sample of member profiles.

11. The system of claim 8, wherein the weight value module is to assign a weight value to a phrase from the plurality phrases based on frequency of the phrase in the seed sample of member profiles.

12. The system of claim 8, wherein the weight value module is to utilize support vector machine (SVM).

13. The system of claim 8, wherein the weight value module is to utilize Naïve Bayes algorithm.

14. A machine-readable non-transitory storage medium having instruction data to cause a machine to perform operations comprising:
selecting a seed sample of member profiles in an on-line social network system, a member profile from the member profiles representing a member of the on-line social network system, the on-line social network system maintaining one or more member categories, the seed sample of member profiles comprising a plurality of phrases, each member profile from the member profiles comprising two or more phrases;
for each phrase from the plurality phrases, obtaining a weight value utilizing regularized linear regression, a weight value of a phrase from the plurality phrases calculated based on presence or absence of a respective phrase in the seed sample of member profiles, a combination of a phrase from the plurality phrases and its weight value comprising a weighted phrase, the plurality of phrases with their respective weight values comprising a plurality of weighted phrases for the target category, the obtaining of a weight value for each phrase from the plurality phrases comprises identifying a neutral phrase from the plurality phrases and assigning a zero weight value to the neutral phrase;
accessing a member profile from the member profiles and the plurality of weighted phrases; and
determining, based on a presence of one or more phrases from the plurality of weighted phrases in the member profile, a category score for the member profile, the category score indicating a likelihood of the member profile being associated with the target category;
retrieving, from a database, the category score of the member profile;
comparing the category score of the member profile to a threshold value; and
based on a result of the comparing, selectively identifying the member profile as associated with the target category.

* * * * *